US006539021B1

(12) United States Patent
Kennelly et al.

(10) Patent No.: US 6,539,021 B1
(45) Date of Patent: *Mar. 25, 2003

(54) ROLE BASED MANAGEMENT INDEPENDENT OF THE HARDWARE TOPOLOGY

(75) Inventors: Richard J. Kennelly, Maynard, MA (US); Kenneth W. Ouellette, Groton, MA (US)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/165,508

(22) Filed: Oct. 2, 1998

(51) Int. Cl.[7] .................. H04L 12/66; G06F 15/173; G06F 15/16
(52) U.S. Cl. .................. 370/401; 370/352; 370/356; 709/224; 709/225; 709/229
(58) Field of Search .................. 370/352, 356, 370/401, 389, 428, 419, 421, 466, 467; 709/223, 224, 225, 229, 201, 202, 217, 218, 219, 221; 345/433, 356, 357

(56) References Cited

U.S. PATENT DOCUMENTS

| | | | | | |
|---|---|---|---|---|---|
| 5,872,779 | A | * | 2/1999 | Vaudreuil | 370/352 |
| 5,889,953 | A | * | 3/1999 | Thebaut et al. | 395/200.51 |
| 5,991,292 | A | * | 11/1999 | Focsaneaunu et al. | 370/352 |
| 6,055,575 | A | * | 4/2000 | Paulsen et al. | 709/229 |
| 6,101,182 | A | * | 8/2000 | Sistanizadeh et al. | 370/352 |
| 6,101,539 | A | * | 8/2000 | Kennelly et al. | 709/223 |
| 6,138,155 | A | * | 10/2000 | Davis et al. | 709/224 |
| 6,189,033 | B1 | * | 2/2001 | Jin et al. | 709/225 |
| 6,233,234 | B1 | * | 5/2001 | Curry et al. | 370/356 |
| 6,233,618 | B1 | * | 5/2001 | Shannon | 709/229 |
| 6,321,259 | B1 | * | 11/2001 | Ouellette et al. | 709/220 |

OTHER PUBLICATIONS

"SNMP MIB Extension for Multiprotocol Interconnect over X.25", D. Throop, Data General Corporation, 5/93, pp. 1–14.
"View–Based Access Control Model (VACM) for the Simple Network Management Protocol (SNMP)", B. Wijnen et al., 8/98, pp. 1–3 (Internet Draft).

* cited by examiner

Primary Examiner—Huy D. Vu
Assistant Examiner—M. Phan
(74) Attorney, Agent, or Firm—Fish & Richardson P.C.

(57) ABSTRACT

A network packet switch provides access to a network-based computer system. The network packet switch has a public access port and a private access port, and includes a computer-readable medium containing a computer program product for producing management objects that configure the network packet switch. The switch stores a set of management objects, determines attributes of an organization associated with one or more of the management objects, and defines a subset of management objects associated with the organization based on the attributes of the organization. The switch provides the user with the same access to a set of functions defined by the subset of management objects regardless of whether the user accesses the network packet switch by the public access port or the private access port.

20 Claims, 8 Drawing Sheets

ROLE BASED MANAGEMENT INDEPENDENT OF THE HARDWARE TOPOLOGY

BACKGROUND

This invention relates to configuration management of network packet switches.

The development of different network technologies and the need to interconnect multiple packet networks each using different protocols led to the growth of inter-networking. The so-called "Internet" is an example of inter-networking. The Internet allows diverse computers on different physical networks to communicate, using a standard set of TCP/IP protocols. So-called "Intranets" are another example of inter-networking. Intranets use the same set of TCP/IP protocols over a private network of computers. While the Internet is global, Intranets are private, often associated with a single firm or organization.

The private networks often employ different hardware configurations than the public networks. The different hardware configurations can affect the performance of the computer system in different ways. For example, the same user having administrative privileges on the networked computer system may have access to different functions when accessing the system through an internet service provider than when accessing the system through a private side access port. Thus, the hardware topology may limit the functionality of the system.

SUMMARY

In one aspect of the invention, a network packet switch provides access to a network-based computer system. The network packet switch has a public access port and a private access port, and includes a computer-readable medium containing a computer program product for producing management objects that configure the network packet switch. The switch stores a set of management objects, determines attributes of an organization associated with one or more of the management objects, and defines a subset of management objects associated with the organization based on the attributes of the organization. The switch provides the user with the same access to a set of functions defined by the subset of management objects regardless of whether the user accesses the network packet switch by the public access port or the private access port.

Preferred embodiments of this aspect of the invention may include one or more of the following features.

At least one management object available to the user is unique from other management objects available to other users of the same organization. At least one management object available to the user is unique from other management objects available to other users of different organizations. The management objects can be provide a graphical user interface having tow control areas, one that is based on the JAVA programming language and the other based on the HTML programming language.

The switch establishes a request processor object to incorporate attributes of the user from a predefined data structure. The switch sets variables of the request processor object with the attributes. The data structure defines the attributes of the user, the variables define the set of management objects associated with the user. The request processor object parses data files and dynamically produces management objects that are unique to the user. The request processor object uses indicator tags to parse the data files. The indicator tags include a security tag, a server side include tag, and a script tag. The interface can be one of three interface types: a standard interface, a guided interface or a services interface.

The switch associates authorized data of the data files with the management objects accessible by the user; and disassociates unauthorized data of the data files the management objects accessible by the user. The request processor object includes a parser based on the attributes of the user and a data manager. The data manager accepts data parsed by the parser to assemble the subset of management objects.

Embodiments within the scope of the claims may include one or more of the following advantages.

Administrative or other privileges of the user can be determined, and configured, independently from the location and access capabilities of each individual user, such as an administrator. For example, neither Internet service provider (ISP) access nor private local area network (LAN) access can affect a view of the graphical user interface presented to a particular user. Therefore, the view and the accessibility functions can be independent of the hardware interface. However, the views can be customized based on the user or based on the hardware interface. Therefore, the hardware interface does not limit the ability to administer resources of the switch.

BRIEF DESCRIPTION OF THE DRAWINGS

The foregoing features and other aspects of the invention will be described further in detail by the accompanying drawings, in which.

DETAILED DESCRIPTION

Figure 1:
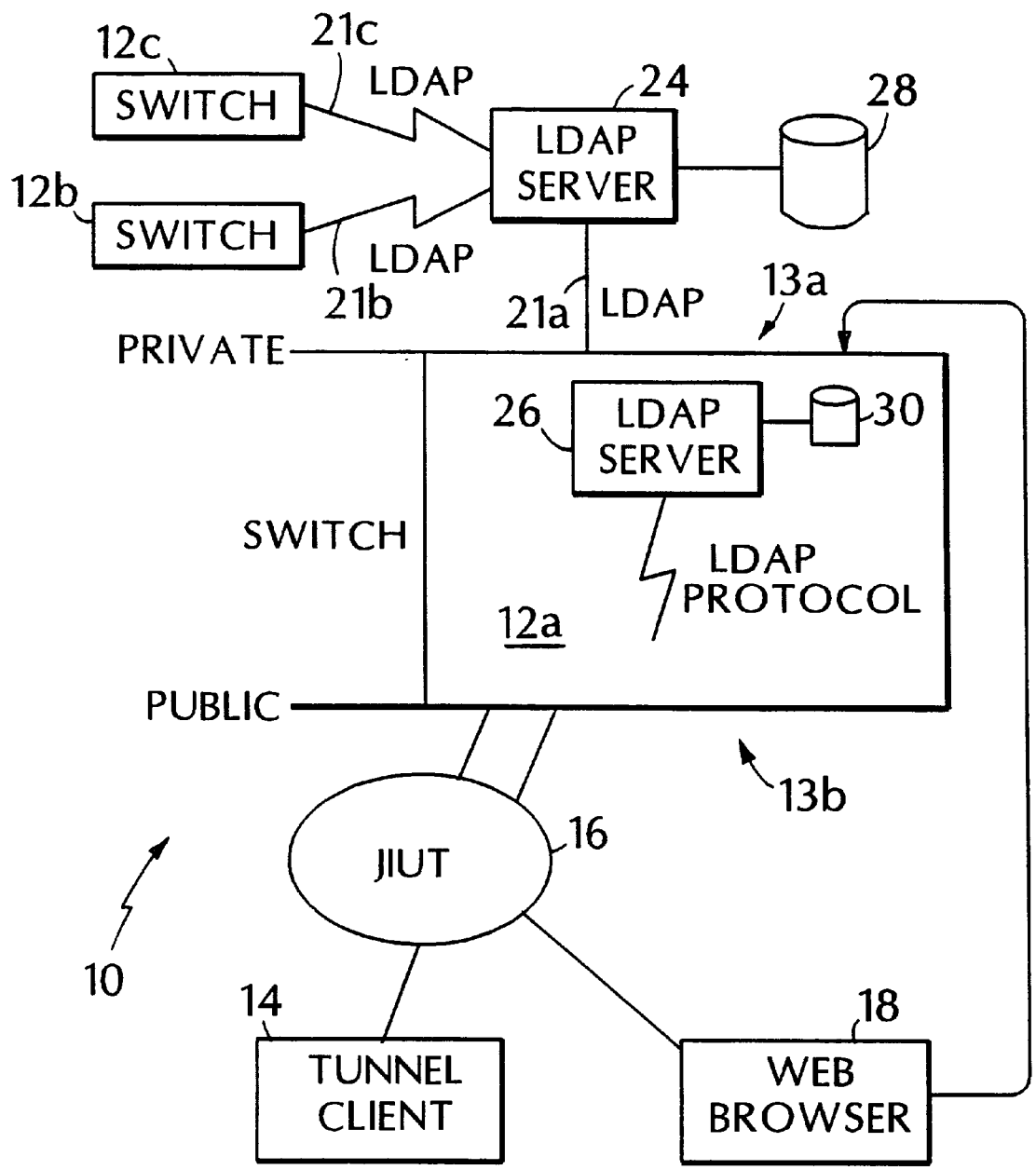
FIG. 1 is a block diagram of a network computer system including a network packet switch.

Referring now to FIG. 1, a network system architecture 10 includes a network packet switch 12 that has at least two entry port types. The switch 12 has a private port side 13a and a public port side 13b. The public port side 13b of the switch is accessible via the Internet 16 or equivalent, generally through a tunneling client 14 that runs a web browser 18 to manage the switch, 12a. Similarly, the private side 13a of the switch 12 is accessible via other network packet switches particularly those having at least two entry port types such as switches 12b, 12c. Typically the switch 12a is on the same internal network connection as the other switches 12b–12c. This network connection is sometimes referred to as an Intranet connection. Alternatively, access can be provided via a tunnel client on the private side, a web browser through a tunnel or without a tunnel client.

The switch is also coupled to a server 24 via connections 21a–21c. Here the server 24 implements the LDAP protocol (Lightweight Directory Access Protocol, i.e., RFC 1777 standard protocol). Switches 12a–12c communicate with the LDAP server 24, via the LDAP protocol. The server 24 and switches 12a–12c can reside on a local area network (LAN). Alternatively, the switch 12a can have a local LDAP server 26. In either event, the LDAP server 24 or the local LDAP server 26 accesses a schema database 28 (stored remotely) or a schema database 30 (stored locally). The server 24 and schema database 28 can be shared by switches 12a–12c.

Figure 2:
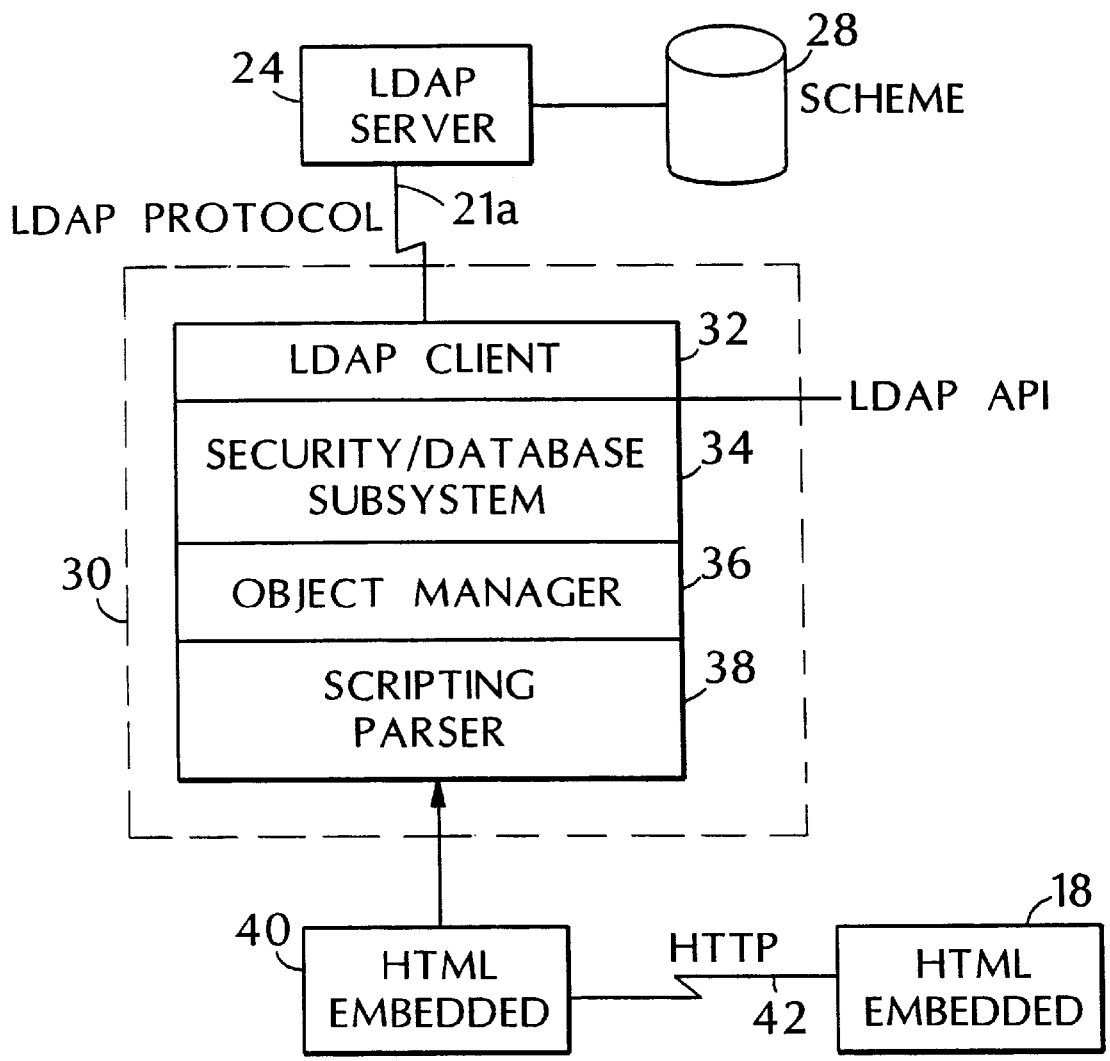
FIG. 2 is a block diagram of a database management subsystem used in configuring the network packet switch shown in FIG. 1.
Figure 3:
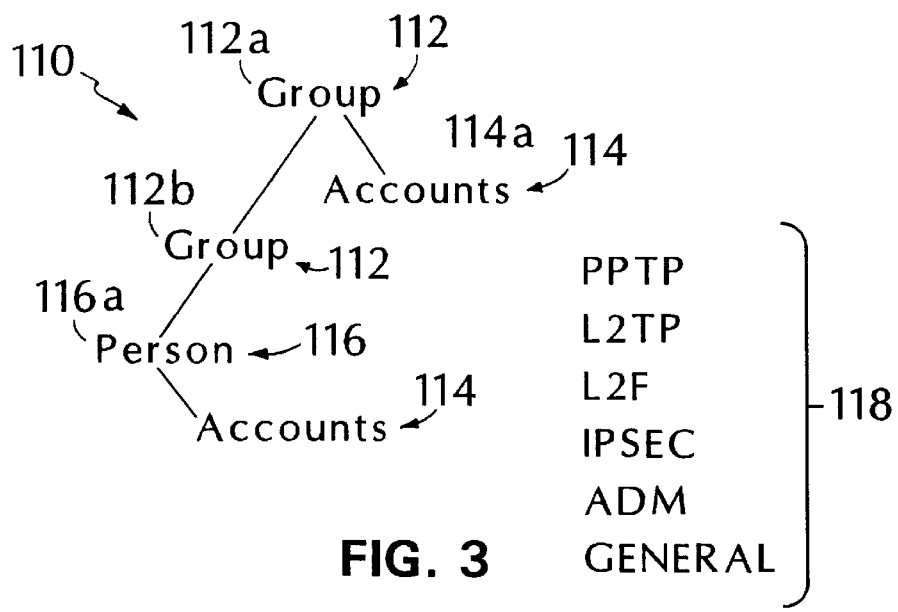
FIG. 3 is a diagram of an inheritance schema for use in the database management subsystem of FIG. 2.

The schema database e.g., schema database 28, as will be described in conjunction with FIG. 3, is used by an administrator of the switch, e.g., switch 12a, to remotely configure the switch 12a for various administrative functions, as will be described. In particular, the schema database 28 and database management software 30 (FIG. 2) allows an administrator to remotely configure the switch 12a. A web browser 18 interfaces with the database management software 30 (FIG. 2) by using a graphical user interface (GUI). One preferred GUI is provided by using hypertext markup language (HTML) based web pages.

The switches 12a–12c allow a set of users to have so-called Intranet privileges, via the public side 13b of the switch 12a by accessing the switch 12a through the Internet. The switch 12a can also allow a group of users to have the same or different Intranet privileges, via the private side 13a of the switch although the switch does not distinguish between which side of the switch a user comes in on. With the switch 12a a user who is a member of the general public can have access via the Internet into public portions of a corporate Intranet. An administrator can allow the general public users access to selected information on the corporate Intranet. Thus the administrator can set privileges on an organizational level, e.g., corporate users in an organization vs. general public users. Also the administrator can set different sets of privileges amongst different organizations e.g., different corporate or business users.

Additionally, the switch 12a permits Intranet users to have different sets of privileges, as determined by the administrator. The switch 12a uses the schema database 28 that stores account attributes to set up different groups of users or people having different attributes or privileges. This permits different levels of access to information on the corporate Intranet.

The switch 12a performs packet filtering based on the privileges of the sender of the packets in a particular session. That is, filters in the switch limit the types of packets and their destinations based on attributes. Packet filtering rules are set up in the switch 12a. One set of rules is at a physical level that permit authorized tunneling packets to enter the switch, e.g., via the Internet, to establish a virtual private connection with the switch 12a. A second set of filter rules allows transfer of packets between the corporate Intranet and the Internet depending upon the privileges of the user. This arrangement, for example, permits an administrator to manage the switch 12a either from a corporate local area network via the private side 13b of the switch or, alternatively, through a tunneling client 14, via the public side 13a of the switch 12a.

The switches 12a–12c share the same common database schema 28. Alternatively, the switches can have local copies of the database stored internally, as mentioned above for database 30. In either event, the database and schema define user attributes to each user of the system. The local option of the schema database is provided to ease configuration particularly for a single switch. Otherwise, a separate server would always be required.

Referring now to FIG. 2, database management subsystem software 30 contained in the switches 12a–12c is shown. Database management subsystem 30 includes a client interface to the LDAP server 24, here an LDAP client 32. The database management software subsystem 30 also includes a security/database subsystem 34. The security/database subsystem 34 provides user authentication and authorization functions for the switch. It provides this access to objects in the schema database 110, the operating system and the object manager.

The database management software 30 also includes an object manager layer 36. The object manager layer manages access to objects in the system 10. The object manager layer 36 translates operations from a scripting parser 38 that implements a scripting language into a query for a particular piece of information which resides in objects that can be accessed by the object manager 36. The object manager 36 translates scripting language requests from a scripting parser 38 into a query for a particular object. The object layer maps these objects to entries in the database schema 28. With this object manager 36 an administrator, using an interface provided by a web page, can obtain access to a value represented by an object whether the object is stored as an entry in the schema database 28 or existing as an object in the operating system. The object manager 36 also can control a view of an object, or control setting a value of an object.

The basis for configuration management in the packet switch 12a is a data interface structure 35 produced by the object manager 36 when the system is initialized by producing individual nodes, linking them to each other, and defining their default values. The data interface structure 35 is organized in a tree structure to facilitate locating information. Each element in the data interface structure 35 can have an ASCII name associated with it. A base class defines the tree structure and maintains a parent node pointer, siblings pointer, children pointer, and a pointer to data and provides methods for inserting elements in the structure, sequentially traversing it, or finding a node. The data nodes contain pointers to the sources of data for the data interface structure. Such sources of data could be, for example, the operating system, the schema database 110 or data files 160. The data interface structure 35 has two types of nodes, end nodes and intermediate nodes. Intermediate nodes are collections of node types including other intermediate nodes and end nodes. The intermediate node type is a record object. All the other node types (e.g. integer, text, enum, IP address) are end nodes.

The data interface structure 35 is maintained in ascending order based on the ASCII label and duplicate labels not allowed. After the data interface structure 35 is constructed, the object manager's SetToDefaults method is invoked and iterates through all the uninitialized entries, setting the node objects to their default values. End node objects set their individual items to their default values. Record objects iterate through all their records and fields setting them to defaults.

The object manager 36, acts as a central management entity of the data interface structure 35 (FIG. 7) to provide access methods to initialize, get, and set individual data items based on their name. The data interface structure 35 provides access to both persistent and dynamic data. The object manager provides a set of routines to access, define, and save data in its data interface structure 35. Definition methods include New, Attach, and SetToDefaults. Access routines include Create, Destroy, Find, Get, Validate, Set, First, and Next. Save methods include PrintAll and Write-ConfigFile.

The data interface structure 35 does not contain the actual data that is accessed, rather the data interface structure 35 maintains characteristics about the data and contains pointers (i.e., data pointers) to the data. The actual data can reside in the operating system or the schema database 110. As requests are made to the object manager 36, the object manager 36 searches the data interface structure 35 for a matching name and then accesses the data using the pointer information.

When a request for information is made, the object manager 36 searches its data interface structure 35 to find the information being requested. The object manager 36 parses the string passed to it, identifying nodes in the data interface structure 35 and invoking the node object to further interpret the string. Another feature of the object manager 36 is the capability to undo an operation. When changes are made to the data through the object manager, it maintains an undo log (not shown) of the changes. These modifications can be sequentially reapplied to the data to reverse previous operations. All requests terminate at an end node and the end node acts upon the request.

Three examples for accessing records are provided: accessing an end node attached to a root of the data interface structure 35, accessing an intermediate node without a key, and accessing an intermediate node with a key.

If the object being accessed is an end node attached to the root, the object manager searches the object data interface structure 35 for a matching label. If one is found, the appropriate method (get, validate, set) for the end node object is invoked.

For example:

ObjectMgr.Get("NumberOfLANs", buffer, NumberOfbuffer);

This call to the object manager 36 results in a search of the object manager root's children for the node labeled 'NumberOfLANs'. If the NumberOfLAN's node is found, the node's GET method is invoked to fill the buffer with the ASCII value of the NumberOfLAN's variable.

To accessing an intermediate node, the object manager searches for an object with a matching label. If one is found, the object manager passes the label starting from the first byte after the label to the node for further processing. Throughout this example, the following sample will be used:

ObjectMgr.Set("System.Password=xyzzy");

The object manager searches the data interface structure 35 root's children for a node labeled 'System'. When it is found the object manager invokes the 'System' node's SET method passing the rest of the string (".Password=xyzzy").

Since the 'System' node is an intermediate node of type: Record, an OmnRecord class object is invoked. The record object checks for the presence of a key (determined by a set of '[ ]'). None is found, so the record object checks for a member field identifier (a '.'). If a period exists, the record object searches its children for a matching label.

In this example it searches the 'System' record's children for the 'Password' node. Assuming the password node was found, the record object invokes the 'Password' node's SET method. In this example, the password OmnTextCls object is passed the remainder of the string ("=xyzzy") to copy value "xyzzy" to the 'System Password' string.

To access a field within a record the object manager 36 interprets the key, defines the member and accesses the object. This operation identifies the record being accessed and notifies the key handler to set it's local context to a record (save a pointer to the object). The define member operation uses the pointer set in step 1 in combination with the memberId to further define the object being accessed. The object manager 36 accesses the object using the node's access method (GET, SET, VALIDATE). If the record contains additional nested records the entire sequence keeps repeating until an end node is reached and accessed.

For this example, assume a call

ObjectMgr.Get("Users[SmithJ].Password", buffer, NumberOfbuffer);

is made. If the object being accessed is an intermediate object with a key, the object manager searches for the object with the matching label. If one is found, the object manager passes the label starting from the first byte after the label to that intermediate object for further processing ("[SmithJ].Password"). Since the 'Users' node is a record object, the OmnRecord class object checks for the presence of a key (determined by a set of brackets '[ ]'). Since brackets exist, the record object invokes the 'Users' key handler with a pointer to the first character after the '[', in this example 'SmithJ].Password'.

The key handler's InterpretKey method interprets the ASCII text before the closing ']'. In this example, the 'Users' key handler might walk a linked list of logged on users matching the name with 'SmithJ'. If the handler has successful interpreted the key, it should save its local context and return SUCCESS. Otherwise it should return FAILURE.

After successfully processing the key via the InterpretKey method, the record object skips the closing ']' and checks for the presence of a '.'. If a period exists, the record object invokes the OmnCls FIND method to search the record object's children for a matching label. In this example it searches the 'Users' record's children for the 'Password' node. Finally, the record object invokes the password node's Get method passing the rest of the string ("") to copy the 'SmithJ' password string into the buffer provided by the caller to ObjectMgr.Get.

A scripting parser 38 is a scripting engine that uses a scripting language (referred to below as "noc_tags") that converts embedded scripting from HTML pages (hypertext mark-up language) into HTML for the browser. The final HTML that is sent to the browser may contain data that was retrieved from objects in the object manager 36.

For example, a script in the web page can provide that a view furnished to the user show the user all of the "groups" contained in the schema 28. The embedded script is fed to the scripting parser to access a portion of the database. The scripting parser 38 receives the embedded script from the HTML page and parses the script into methods that can retrieve objects. That is, the scripting parser 38 takes the embedded script and accesses whatever object manager objects (not shown) the scripting parser needs. Web pages are written with the embedded scripts that enable the database management subsystem 30 to provide queries to the operating system and schema database to access objects needed to satisfy the script. The object manager 36 will determine whether the object can be accessed from the operating system or from the schema database 28. The object manager 36 will generate the query to retrieve entries corresponding to the needed objects.

The query is processed by the LDAP server 24, searching the schema database 28 for the entries. The object manager 36 maps the parsed script to hierarchical entries i.e., nodes in the schema database 28. The query is sent to the database server 24 to find all of the entries in the schema contained in the schema database 28 that correspond to the request. The query contains a entry in the database schema at which to begin a search. A filter criteria is set for the query and includes a set of attributes, values and a scope for the search (e.g., the entire subtree, one level deep subtree or just the search base entry).

The schema database 28 and LDAP server 24 return entries that match the query generated by the object manager 36. The object manager 36 maps the entries back into object manager objects. The scripting parser 38 will combine the returned objects with HTML to complete a the web page to present on web browser 18.

Referring now to FIG. 3, an inheritance schema 110 that involves objects which represent entries or nodes in the database system 28 and which are treated as objects by the switches 12a–12c(FIG. 1) is shown. The schema 110 represents objects, as entries in the database, and is organized into entries that represent groups 112, persons 114, and account types 116. The schema 110 is stored as a hierarchial tree structure. At the top or apex of the schema 110 is an entry type for which all other types are derived from. A type entry "group" 112 such as group 112a is a child of an entry. Group type nodes are parent nodes for other group nodes and person nodes. Group type nodes are parents for and can support a separate hierarchy provided by account types. Group 112a has a parent-child relationship with another group 112b. Additional inheritance is supported at the group 112a node by a sub-tree structure provided by different account type entries. Group 112b is a parent for person entry 116a. For each level in the hierarchy, entries in the level will have a so-called parent-child relationship to entries in sub-levels.

Groups 112 can contain an account 114a or a set of accounts such as shown for group 112a. An account type or a set of accounts can also have a child relationship to a person node 116 such as shown for "person" 116a. Person nodes represent persons and are also parent nodes for account nodes. There can be a plurality of different types 118 of accounts.

The account types 118 included in the schema 110 are PPTP (point to point tunneling protocol), L2TP (layering two tunneling protocol), LF2 (layering forward protocol), IPSEC (Internet protocol security tunneling) and a "general" account type that is used for other types of protocols that do not fall into one of the above four categories, i.e., a miscellaneous category type. Alternatively, of course, other types of protocols can be included in the schema 110.

Another account type is ADM used to store user id's and passwords for persons having administrator privileges. This account type also stores the management level of the privileges. Tunnel accounts may not have the information pertaining to administration. Therefore, in those circumstances, a person logging in as an administrator through a tunnel will have administrator privileges verified by reference to the ADM account.

The schema 110 is a hierarchial relationship like a file system. The schema 110 does not have any backward loops, that is, each object in the schema is a unique entry. As mentioned above, however, the schema 110 can have a mixture of "group", "account types" and "person" entries. Thus, for example, a group 112 can have a parent-child relationship in the hierarchy with another group 112 and can contain a sub-tree in the account 114. A group 112 can also have a parent-child relationship with a person 116 and a person 116 can have a parent-child relationship with an account group 116. The benefit of this arrangement of the schema is that attribute values can be set at any level. Those that are not set can be inherited from a parent or grandparent. Accounts hold the attributes that are assigned at various levels in the schema 110. In order to provide a value for entries under an account, a group needs an. Multiple levels of groups are useful for setting common attributes near the root or top of the hierarchy while overriding selected ones of the attributes in groups or person entries in lower levels of the hierarchy.

Figure 4:
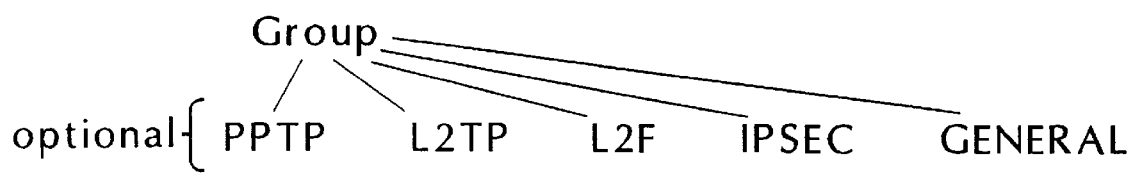
FIG. 4 is a diagram of a portion of the inheritance schema of FIG. 3.
Figure 5:
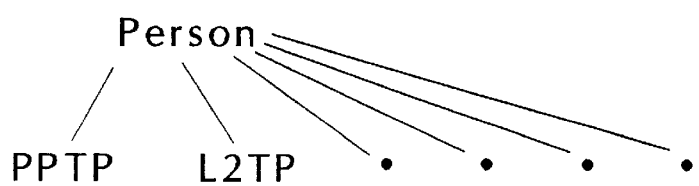
FIG. 5 is a diagram of another portion of the inheritance schema of FIG. 3.

Referring now to FIG. 4, a group entry 112 can contain a PPTP account and the other accounts in the schema could be optional. That is, the group does not need to contain the L2TP, L2F, IPSEC or GENERAL account types. Similarly, a "person" entry can have a single type of account such as PPTP with the other accounts not being available or optional, as shown in FIG. 5.

Figure 6:
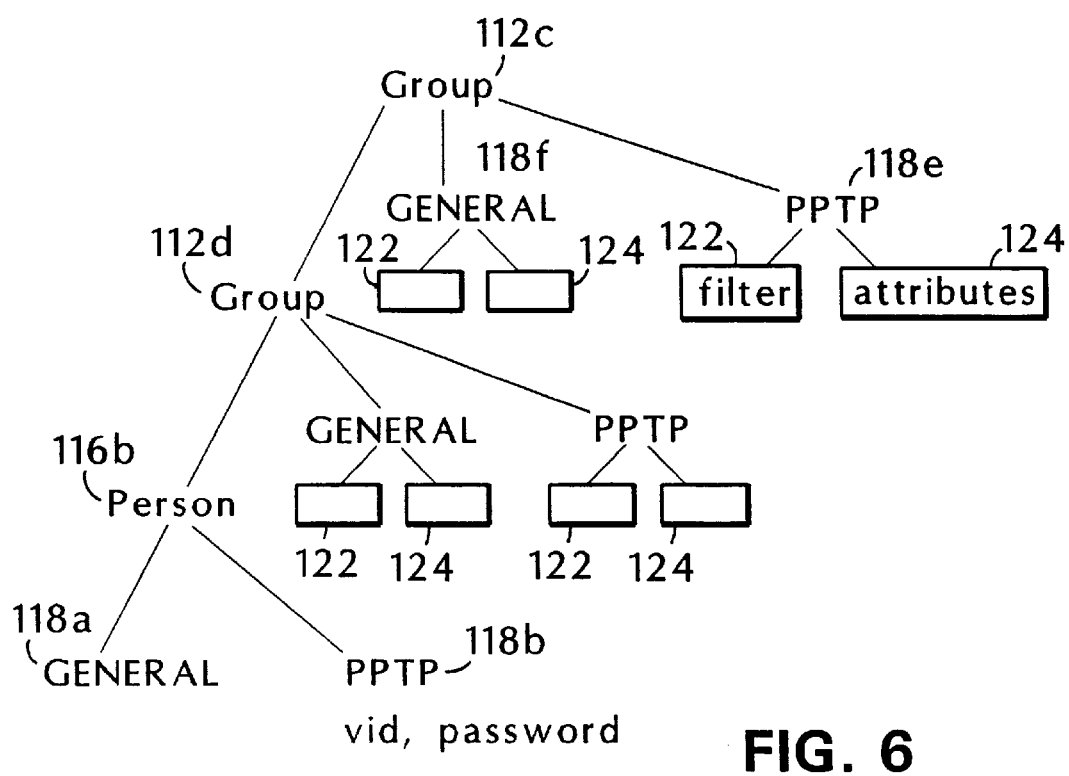
FIG. 6 is a diagram of the inheritance schema of FIG. 3 showing attributes.

Referring now to FIG. 6, under each of the accounts 114 are stored a plurality of attributes which are the parameters used to define access and view that a user would have to objects managed by the switch 12a. These entries store all the information that is needed to configure a particular section of the switch 12a (FIG. 1). The schema 110 allows a large number of attributes to be applied for different account types, for example, PPTP and have some of those attributes not applied to other account types such as, for example, L2TP. Thus, in some account types overrides can exist for a user where in other account types the attributes can be inherited from attributes common to the account type as will be described.

Thus, for example, the attributes can be shared by one or more or all of the account types. The attributes could be specific to one of the account types or, alternatively, the attributes can be specific to a particular user. The schema 110 permits an override for any particular attribute for any particular account type. Inheritance in the schema 110 is as follows.

As shown in FIG. 6, a group 112c that inherits from an "entry" (not shown) can have another subgroup 112d under it. The group 112d can, as shown, have a person 116b with two account types under it, "general" account type 118a and PPTP account type 18b. When a user logs into the switch, as described in conjunction with FIG. 1, the user provides a user ID "U_ID" and a password "PASSWORD" or some other sort of credentials that are verified by the security/database subsystem 34 in switch 12a. The switch 12a stores these credentials in specific accounts in the schema database 28. These credentials are unique across the schema 110 so that given a specific tunneling type such as PPTP etc. and a user ID "U_ID" and password "PASSWORD", the combination will be unique.

The login process produces a specific login vector (not shown) for the PPTP login procedure. With this login vector, the switch 12a can find specific account information for this alleged user. The LDAP query is constructed from the top of the tree for a subtree search with a filter looking for an account of the correct type containing the given user ID. From the schema 110 stored in the schema database 28, the switch 112 determines that this person 116b is a member of the group 12d and is also a member of the group 12c. The switch 112 searches attribute by attribute and obtains values of the attributes that are needed to provide all of the attributes for the user.

The switch 12 determines if there is an override for a particular attribute of the user by looking at all of the entries in the database starting at the lowest sublevel until an override is found. The switch 112a, for example, may look for a particular attribute. For example, the switch made such a filter definition 122 for the user. The switch 12a will test if the filter definition was set in the person's PPTP account 118b. If there was not a filter definition set in the person's PPTP account 118b, the switch 112a will examine if a filter definition was set in the general account 118a for the person 116b. If the switch 112a finds a filter definition 122 set in the general account, the switch 112a will consider that filter definition 122 as an override for the filter definition 122 for the person 116b in the schema 110. If the user had other account types, the switch would look at these other account types to determine if there was an override for the particular person 116 in the other account types that may exist for the person.

If there was not an override set for the person 116, the switch 112a will examine one level up to the group 112d. The switch 12a will determine that there is a PPTP and GENERAL account for the group 112d. The switch will examine the attributes 124 of the PPTP account 114e for that group 112d. If the PPTP account for the group 112d does not have a filter definition 122, the switch 12a will bypass that account type and check the general account for the group 112d. If there is a filter definition in either the general account or the PPTP account for the group 112d, that will become the filter definition 122 for the user. That is, the switch 12a will consider that to be an override for the filter definition 122 set for the PPTP account for all persons that are contained within group 112d. If the PPTP account type 114 does not have an override type for the filter definition 122, the switch will repeat the same process with the next group 112c, which is the node at the top of the hierarchical structure. The switch will use whatever value is present in the account types PPTP and general 118e, 118f, respectively.

Since all of the objects in the hierarchial structure are stored as entries, each entry other than the top or root entry is a subordinate entry of another entry. The entries in the schema base 28 are stored using the so called "Lightweight Directory Access Protocol" mentioned above. The LDAP schema defines an application programming interface, a protocol and a schema definition. A schema definition defines the manner in which rules are used for structuring the database and how the database is actually implemented. It defines, therefore, how the entries are stored in the database. The schema definition is a mechanism for storing entries in the hierarchial database 28 and the definitions of the entries that are stored in the structure. The schema defines the structure of the entries in the database regarding the types of attributes that each entry can contain. It also describes how entries may be placed in the hierarchy.

The schema base 28 is shared between the switches 12a–12c, as mentioned. The schema base 28 enables an administrator that uses the switch 12 to set up account attributes for people as well as for different groups of people. The administrator can provide each of the people and different groups of people with different attributes. This enables easy configuration of the switch. The switch is configured such that members of the general public can access the switch from the public side of the switch, and have restricted access to resources contained in a corporate Intranet. On the other hand, an administrator can also access the switch from the public side and be presented with full or the same access privileges from the public side 13a of the switch that the administrator would have over the private side 13b of the switch.

Therefore, with the switch 12a and the schema 110 an administrator can use a conventional web browser over a corporate local area network to provide a view of its access privileges in order to manage the switch 12a. Alternatively, the administrator can secure a connection from a remote site which is not connected to the local area network over the Internet through the tunneling client 14 to manage the switch providing secure access to the switch. The administrator will have the same management privileges and view over the Internet as such administrator would have had accessing the switch over the corporate LAN.

The schema 110 can be sparsely populated with override attributes that can nevertheless be used to define a complete set of attributes for a particular user. The schema 110 allows a switch 12a or other interrogating device to inherit attributes by traversing up the hierarchial structure producing a complete set of attributes for a user. With this arrangement, an administrator can easily change policies for specific users as well as specific groups of users.

Figure 7:
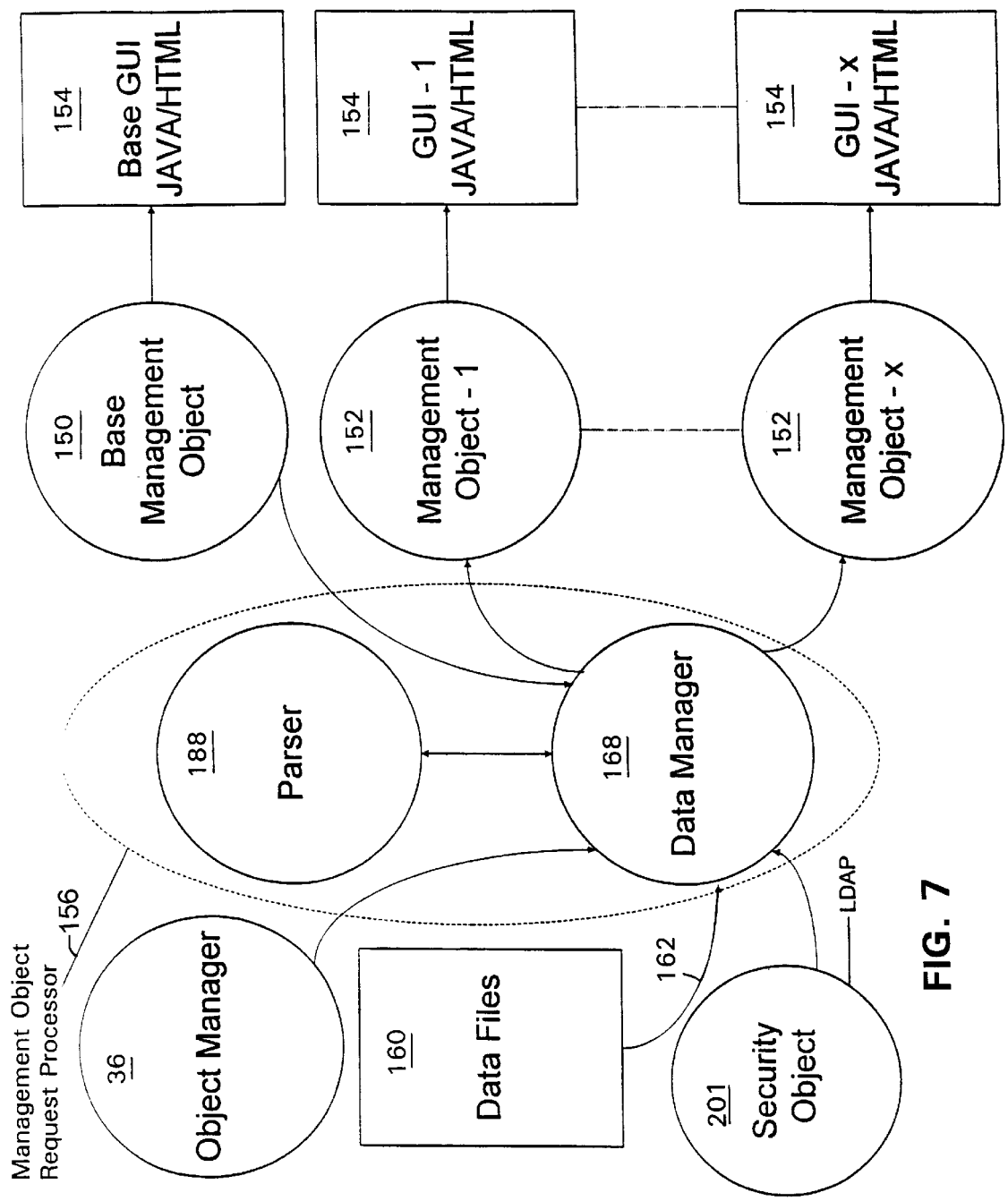
FIG. 7 is an object diagram of management objects.

Referring now to FIG. 7, a base management object 150 is used to produce a set of management objects 152. Management objects 152 are data structures that interface a user to the packet switch 12 and the networked computer system. For example, the management objects 152 may be used to produce web pages. Typically, management objects 152 produce graphic user interfaces (GUI) 154. The GUIs 154 allows the user to access certain available functions by selecting various areas of the interface 154 with a keyboard or a mouse. The management object 152 defines, for example, the appearance of the interface 154, the user-selectable functions available through the interface 154, and the information presented to the user through the interface 154.

The management objects 152 are produced by a management object request processor 156. Packet switch 12 produces the management object request processor 156 when a user initially requests an interface 154 to establish a session. The management object request processor 156 is a memory resident object that exists throughout the session, i.e., from the time the user requests an interface 154 until the time the user logs out or is logged out. To produce the management objects 152, the management object request processor 156 interfaces with the object manager 36, a security object 201, a set of data files 160, and the base management objects 150.

The request processor 156 includes a data manager 168 and a parser 188. The request processor 156 contains a set of variables 158 that the parser 188 populates with attributes 162 of the user. The variables 158 allow the request processor 156 to create a user specific interface from a set of generally available data files 160 and the base management object 150. The management object request processor 156 combines data from the data files 160 with the base management object, which acts as a template to provide the management objects 152. The management object request processor 156 uses the variables 158 to establish user-specific rules that govern the generation of the management objects and, subsequently, govern the operation of the interface 154.

Figure 8:
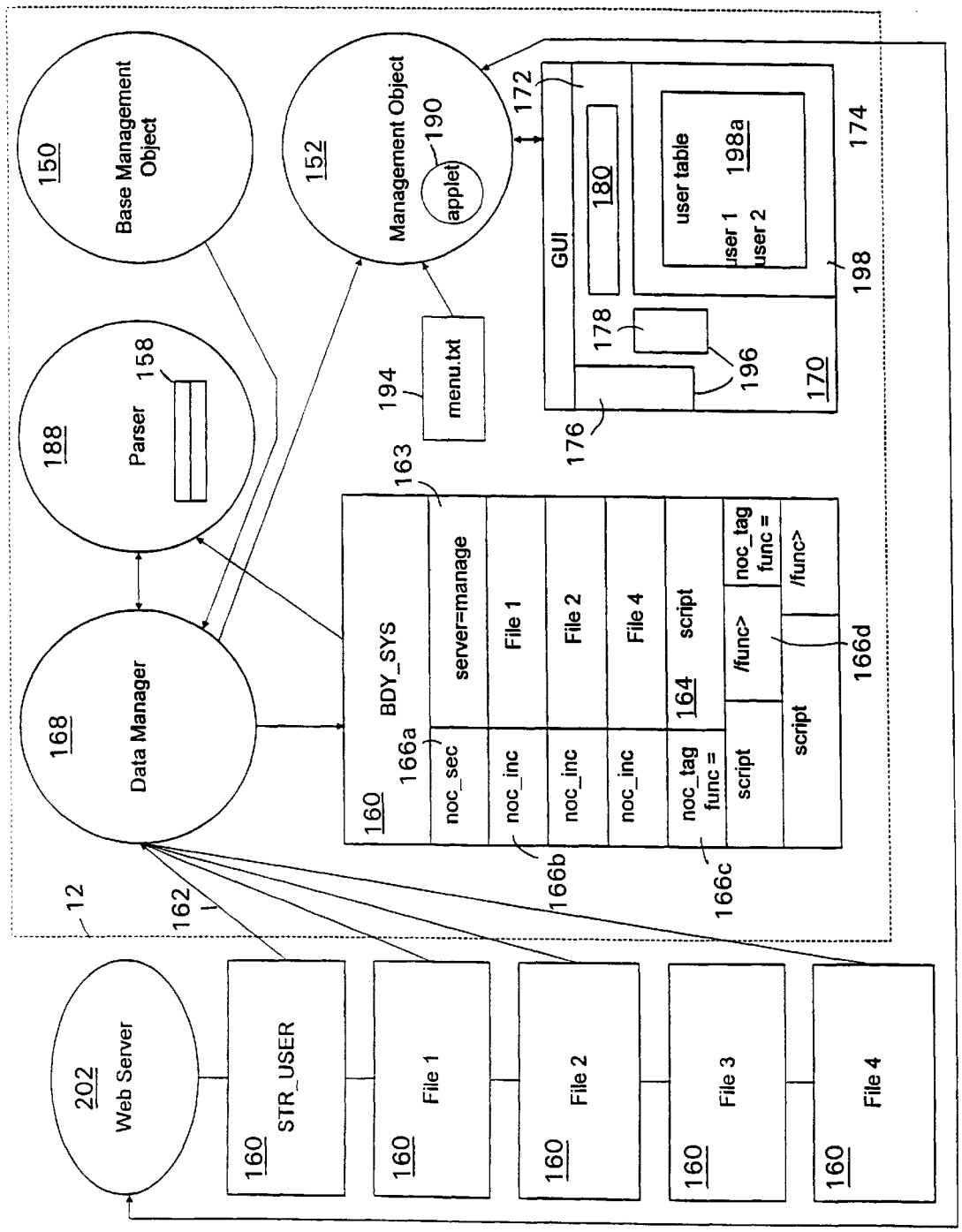
FIG. 8 is a graphic representation of the operation of the system of FIG. 7, wherein a set of data files is parsed to provide a management object that forms an HTML insert for a web page of the graphical user interface.

Referring also to FIG. 8, the user requests a management object through either the public port or the private port of the packet switch 12. The packet switch 12 provides a graphical interface. Through the web page, the user requests the management object 152 either through a menu or by directly typing the address of the page that the user desires to access. The management object request processor 156 processes the request.

If the user has not logged in previously, the management object request processor 156 requests the user identification and password. The request processor 156 interfaces with the security object 201 (FIG. 7) to verify the login information. The security object 201 (FIG. 7) checks the user identification and password against the level of security access privileges of the user. If the information is invalid, the switch 12 prompts the user to enter valid information.

If the information is valid, the management object request processor 156 establishes the parser 188 for the session. The management object request processor 156 populates the variables 158 of the parser 188 with the security attributes 162 for the user. For example, the management object request processor 156 establishes the system administration privileges and the system user rights privileges as "manage" and "view" respectively. Thus, the user can access all management objects 152 that require "manage," privilege or lower to view the management objects 152.

When the user is logged in, the management object request processor 156 begins parsing data files 160. First, the request processor 156 determines the attributes 162 of the user. The request processor 156 parses data files containing the attributes 162 of the user as described in connection with the inheritance schema 28 (FIG. 2–6). The data files 160 are typically data files 160, such as STR_USER, that predominately contain string values 163. The management object request processor 156 uses the string values 163 of the data files 160 to set the variables 158 in the parser 188.

Second, the management object request processor 156 provides management objects 152 to provide a user-specific interface 154. The management object request processor 156 parses additional data files 160 (e.g., BDY_SYS, File 1, File, 2 and File 4) according to rules defined by the variables 158 and by the base management object 150.

To determine the attributes 152 of the user and, subsequently, provide management objects, the data manager 168 and the parser 188 analyze the data files 160. The data manager 168 reads files 160 from a disk and scans the files 160. The data manager 168 searches for information such as string values 163, text, HTML, scripts 164, and tags 166. If the data manager 168 encounters certain types of information in the data file 160 that does not need to be parsed, e.g., text or HTML, the data manager 168 reserves the data and does not transfer the data to the management object request processor 156. If the data manager 168 encounters information in the data file 160 that must be parsed, e.g., scripts 164, the data manages transfers the information to the management object request processor 156.

Information, which the management object request processor 156 must process is indicated by the tags 166. The tags 166 provide a signal to the data manager 168 that different types of data are included. In the present embodiment, the data files 160 contain at least three types of tags 166: security tags 166*a* (e.g., "noc_sec"), server side include tags 166*b* (e.g., "noc_inc"), and script tags 166*c* (e.g, "noc_tag func" and "/func>"). The security tags 166*a*, e.g., noc_sec tags 166, communicate the level of security access that is required for the user to access the information in the data file 160. The server side include tags 166*b*, e.g., noc_inc tags, communicate which data file 160 the management object request processor 156 will read and analyze. The script tags 166*c*, e.g., noc_tag func, indicate that the information following the script tag 166*c* and preceding the end script tag 166*d*, e.g., "/func>", is a script 164.

When the data manager 168 encounters a tag 166, the data manager 168 determines the type of tag 166 and acts appropriately. If the data manager 168 encounters the security tag, the data manager 168 analyzes the tag 166*a* and the associated string value 163, e.g., noc_sec and "server= manage". The data manager determines if the user had the proper privileges to read data from the data file 160. The data manger 168 requests the security privileges from the security object 201. If the security privileges of the user are equal to or greater than the security levels required by the security tag 166*a* then the user is allowed access to the data files 160. If the user has inadequate rights to see any of the data files 160 processed by the user, the data manager 188 will respond with an error message, e.g., "invalid credentials".

If the data manager 168 encounters one of the script tags 166*c*, e.g., "noc_tag func", the data manager 168 transfers the script 164 that lies between the tag 166*c* and the end tag 166*d*, e.g., /func>, to the parser 188. If the data manager encounters the server side include tag 166*b*, e.g., noc_inc, the data manager 168 calls the associated file name, e.g., "File 1", and immediately begins examining the new data file 160 before completing the examination of the current file 160, e.g., BDY_SYS.

As an example, after the user logs in successfully and when the user requests a web page such as BDY_SYS, the data manager 168 will read and examine the file. The data manager 168 encounters server side include tag 166*b* that references a startup file 160, e.g., STR_USER. The data manager 168 reads the startup file 160 and analyzes the data, again looking for tags 166. In STR_USER, most of the data is string values 163 that resides in the file 160 as the script 162 located between script tags 166*c*, 166*d*. The string values 163 represent variable assignment pairs, e.g., strusername="user name". The parser 188 parses the values 163 into the proper variables 158 of the management object request processor 156.

With the proper variables set from the startup files 160, the data manager 168 scans data files 160 for scripts 164, or other information, within the files 160. The data manager 168 transfers the scripts 164 to the parser 188.

When the parser 188 receives a script 164, the script 164 provides instructions to the parser 188. The parser 188 parses the scripts 164, and subsequently organizes a response based on the scripts 164. The parser 188 returns the response to the data manager 168.

For example, the script 164 can indicate that, if a user has a particular attribute 162, such as a level of access privileges equivalent to "manage", the packet switch 12 should display a feature, such as a user table. The parser 188 reads the script 164, examines the value associated with the attribute 162, and, if the attribute 162 is the correct value, calls for the function. The function may be called as an object, or the function may be embedded in the script 164 that the parser 188 is examining.

As the parser 188 analyzes the script 164, the parser 188 may request data from the object manager 36 (shown in FIG. 2) or set data in the object manager 36. For example, if the parser 188 requests data from the object manager, the parser 188 typically incorporates the data from the object manager 36 into a portion of the GUI 154. The object manager 36 also provides other objects, such as the base management object 150.

As the parser 188 analyzes the script 164, the parser 188 organizes the response. The response is a block of text derived from the script 164. The parser 188 transfers the response to the data manager 168. Typically, the response is a block of HTML instructions. The data manager 168 combines the response and the reserved data, such as the reserved text or the reserved HTML. The combination of the reserved data and the response from the parser 188 are output as a Web page on the GUI 154.

In this way, all data files are analyzed by the data manager 168 and the parser 188. Based on the attributes 162 of the user, the management object request processor 156 creates the management objects 152. In the example above, the variables 158 are populated by string values 163 that represent attributes 162, such as the user identification, the user organization, or the user group. However, the management object request processor 156 contains other types of variables 158 such as integer variables to indicate the number of seconds before the session time-out or boolean variables indicating whether a particular filter is enabled. The non-string variables 158 are populated by non-string values 163 in the scripts 164. The data manager 168 transfers the scripts 164 containing the non-string values 163 to the parser 188 from the data files 160.

The management object request processor 156 presets many of the variables 158 within the parser 188. Thus, the attributes 162 of the user are available, through the variables 158 of the parser 188, either to the packet switch 12 or to the computer system connected to the packet switch 12. Thus, the attributes 162 define the administrative functions available to the user from the packet switch 12. Also, the attributes 162 define the functions available to the user from the computer system through the packet switch 12.

The attributes 162 associated with the user define, in part, a set of rules which govern the entire session. In essence, the attributes 162 allow the management object request processor 156 to parse data files 160 and determine, based on the rules defined in the attributes 162, the scripts 164, the base management objects 152, other objects or other data, which functions to include in the management object 152. Thus, the packet switch 12 dynamically provides the interface 154 by tailoring the interface 154, through the management object 152, to the user based on the inheritance schema 28.

Further, the packet switch 12 dynamically provides a set of management objects 152 using the process illustrated in FIGS. 7 and 8. The packet switch 12 incorporates a set of base management objects 150 that define a corresponding set of management objects 152. As described above in conjunction with FIG. 8, the single base management object 150 defines one management object 152, which, in turn, defines one user-specific interface 154. However, the switch 12 provides many additional possible approaches. For example, one base management object 150 can define several management objects 152 for the user. Several base management objects 150 can be combined to define one management object 152 or several management objects 152. In addition, two different management objects 150 can define similar management objects 152 for different users. Other combinations are possible.

Typically, however, the request processor 156 will provide one management object 152 based on one base management object 150. Thus, as each user navigates through the interface 154, the user has a standardized view that is similar in appearance to each user, even though the functions the management object 152 incorporates into the user-specific interfaces will vary from user to user. In addition, the appearance of the interface 154 is not dependent on the hardware topography. Thus, the interface 154 will have the same appearance regardless of whether the user accesses the switch 12 from the private port side or the public port side.

Figure 9:
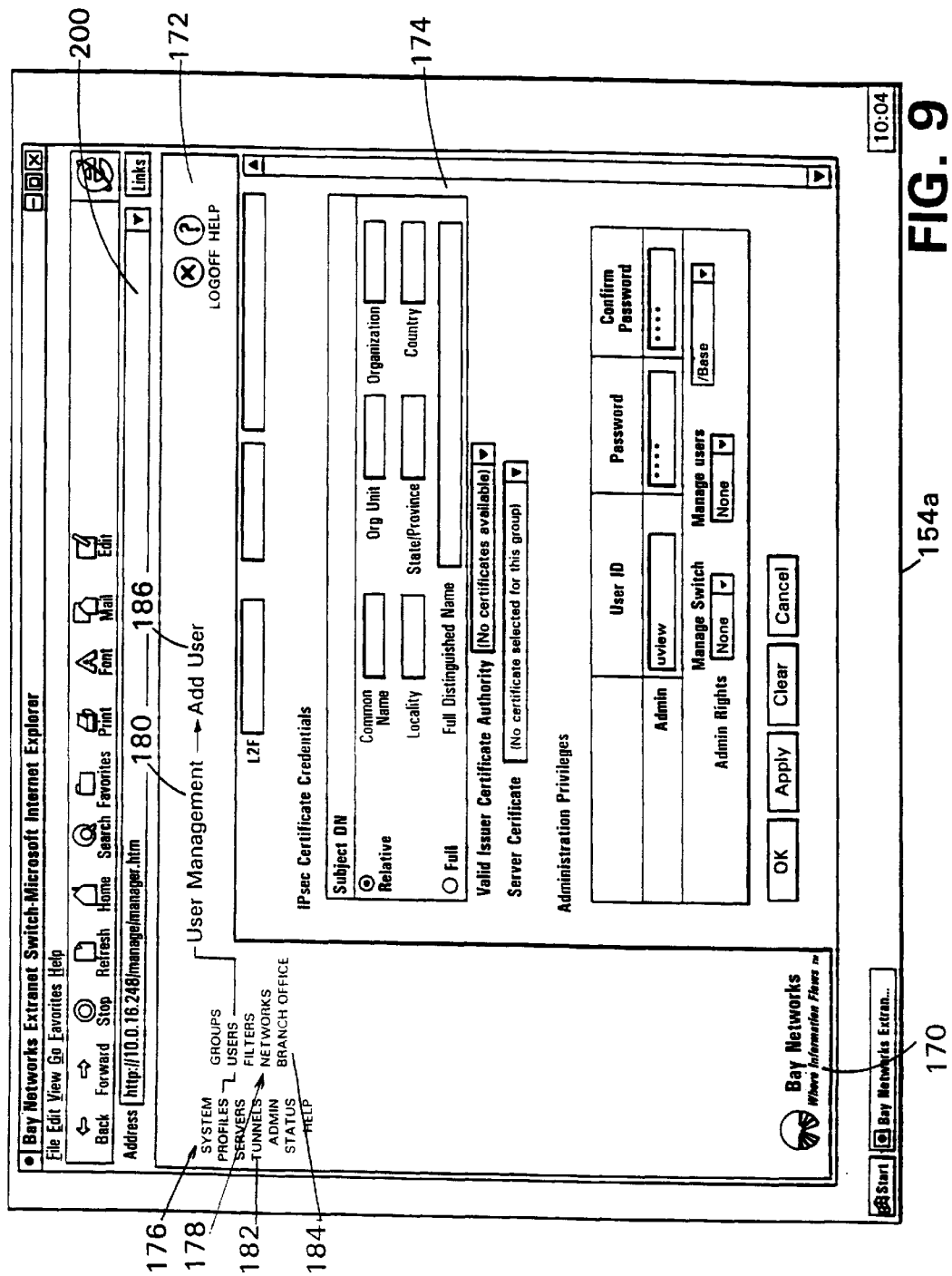
FIG. 9 is a diagram of a graphical user interface based on a management object of the packet switch of FIG. 1.
Figure 10:
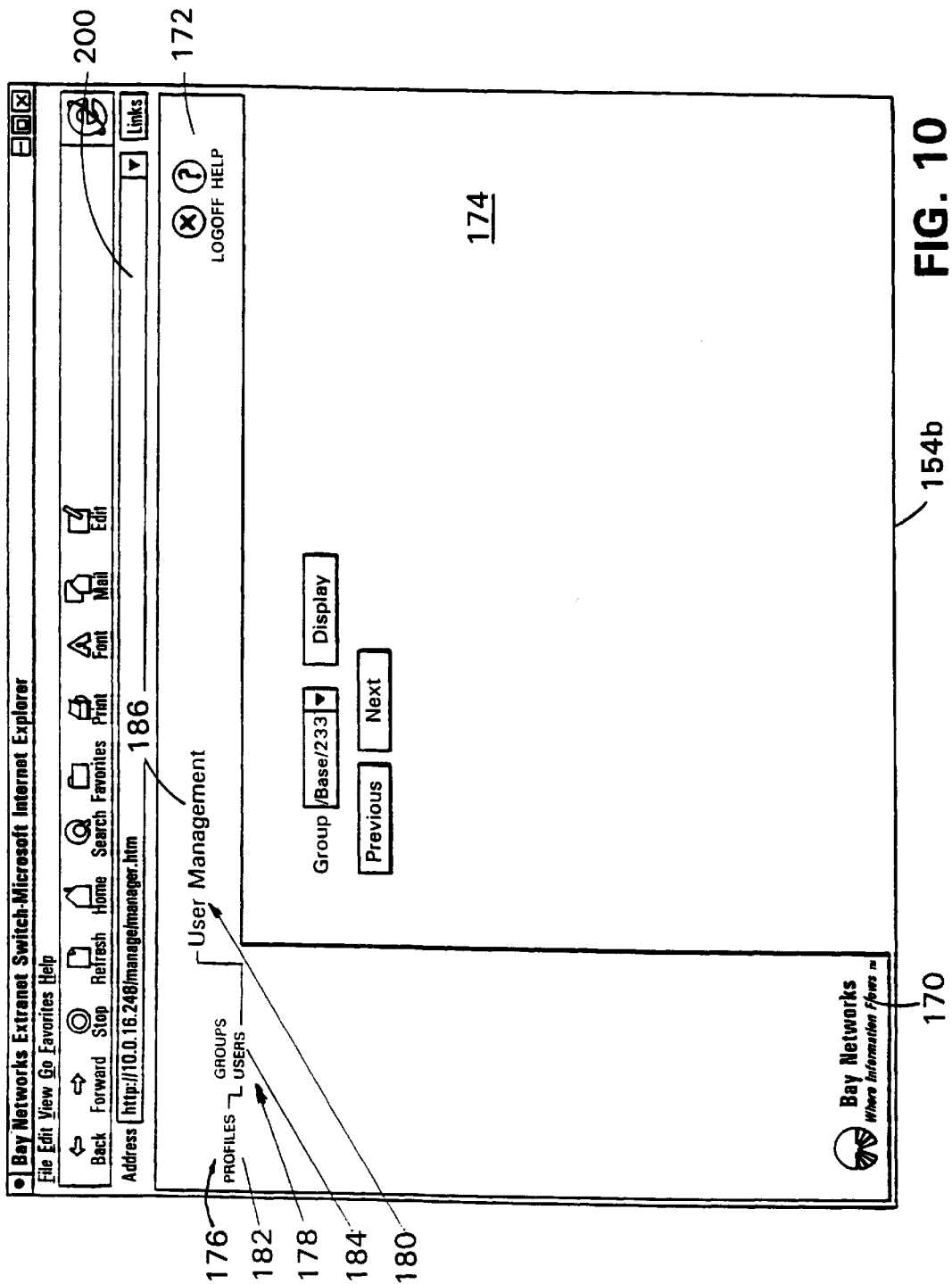
FIG. 10 is a diagram of a different graphical user interface based on a management object of the packet switch of FIG. 1.

Referring to FIGS. 9–10, the packet switch 12 produces the interfaces 154a, 154b, which are web pages for two different users. One management object 152 produces both interfaces 154a, 154b from the base management object 150 shown in FIG. 7. In essence, management object 152 produces interface 154a for a first user having attributes allowing "manage" privileges, and produces interface 154b for a second user having attributes allowing lower than "manage" privileges. When the management object 152 processes input from the interface 154a, the first user receives all the functions required to add a user. (E.g., the interface 154 contains an add button rather than a view button.) When the management object 152 processes input from the interface 154b, the second user receives a relatively unpopulated HTML page and a lesser number of menu functions 182.

When any user selects requests an interface 154, the packet switch 12 selects an HTML frame page. The HTML frame page loads the proper components, including a menu. Thus, the HTML frame page provides, in part, one user specific management object 152 that produces interface 154. The user specific interface 154 has a similar look or style for all users that access the system, as shown by comparing interfaces 154a and 154b. The menu defines the functions 182 that the packet switch 12 can incorporate and the HTML frame page defines the appearance of the interface 154. For example, the management object provides the first user with seven functions and the second user with a single function 182.

As described above in association with the inheritance schema 28, the inheritance schema 28 associates users with at least one of the organizations for the user to access the computer system through the public port or private port of the packet switch 12. Typically, a plurality of users will be associated with each of the organizations. However, the organization could have one associated user or no associated users. For example, the first and second users may be associated with one of several organizations that leases resources of the switch. The first user may be further associated with a subgroup of system administrators of the organization, and the second user may be further associated with a subgroup of managers of the organization.

Each organization, and each of the users of the organization, has a set of attributes 162: the organization having a set of attributes 162 and the user having a second set of attributes 162. Both sets of attributes 162 are derived from the inheritance schema 28 of the hierarchical data structure. The attributes 162 define a range of control functions and access privileges available to each user. For example, the attributes 162 of the first user may define privileges that allows the first user to access the "User Management" function, while the attributes 162 of the second user provide substantially less functionality for the same option.

The attributes 162 of each user additionally may define various account types, a session timeout value, priority levels, percent connection capacity, destination addresses, destination ports, system filters which are invoked during a session, user identification and password information, and a variety of other information. The attributes 162 assigned to each user via the hierarchical inheritance schema 28 produces a set of rules that govern each user's interaction with the packet switch 12 and with the networked computer system 10 communicating through the switch 12.

The attributes 152 can also distinguish between account types for each user. For example, the first user may have an account associated with the administrative subgroup of the organization and a local account. The first user's local account may be accessible from, e.g., the Internet. The local account typically is an account providing lower privileges and functionality. For example, the local account would not have access to functions that control the resources of the packet switch 12 such as the ability to add a user. However, the appearance and function of both the local account and the account associated with the administrative subgroup is the same regardless of whether each corresponding account via the public or private side ports 13a, 13b.

When the first user accesses as an administrator, the packet switch 12 establishes access through the security subsystem 36 of the database management subsystem 30, as shown in FIG. 2. The security subsystem issues LDAP security calls. The LDAP security calls determine whether the user has an acceptable user identification and password. If the user requests an interface 154 through the packet switch 12 and successfully logs onto the computer system through the switch 12, the attributes 162 of the user are returned to the management object request processor 156. Subsequently, the packet switch 12 verifies via the attributes 162 whether the user has privileges of an administrator.

Once the system establishes a session for the first and second users, the switch 12 provides the corresponding interfaces 154*a*, 154*b* to each user. The interfaces 154*a*, 154*b* are divided into three sections: a navigational section 170 (left border), an operational section 172 (top border), and an interactive section 174 (lower right insert). The navigational section 170 and the operational section 172 collectively form a portion of the interfaces 154*a*, 154*b* that is based on the JAVA programming language and HTML. The interactive section 174 forms an additional portion of interface 154 that is based on the HTML program language (Hypertext Mark-up Language).

The navigational section 170 of the interface 154 includes a first level navigation menu 176, and a second level navigation menu 178. The management object 152 includes the set of functions 182 in the first level navigation menu 176, and a set of related functions 184 in the second level navigation menu 178, as the management object 152 generates the interface 154.

The functions 182 of both the first and second navigation menus 176, 178 are provided by a JAVA applet 190, which is called by the management object, as shown in FIG. 8. The applet 190 includes the functions 182, 184 as columns in the first and second level navigation menus 176, 178 respectively. The same JAVA applet 190 is used to construct the navigation menus of each management object 152. Thus, the navigational section 170 of each interface 154 has a standardized appearance or view.

The HTML frame page 150*b* enables the packet switch 12 to load the navigational Java applet 190 in the navigational section 170. Thus, every user-specific interface 154 contains the navigational Java applet 190. The navigational JAVA applet 190 populates the menus. The applet reads a menu file 194, e.g., menu.txt. The menu file is a text-based file with a list of all the menu entries in it. The menu file 194 is a type of data file 160 that organizes the menu entries 196 from the menu file 194 in hierarchical order based on the menu level and the security tags 166*a*.

The menu also file contains a set of tags 166*a* that denote the security attributes 162 for each of the menu entries. The security tags 166*a* indicate the level of privilege required to access the menu entry 196. The menu entry 196 then includes two security tags 166*a*. The first tag 166*a* indicates the user management security level, and the second tag 166*a* indicates the switch management security level.

The management object 152 contains scripts 164 that the applet 190 uses to create the navigational menus 176, 178, 180. Each portion of the script 164 associated with the first level navigation menu 176 has a corresponding set of scripts 164 of the second level navigation menu 178. The JAVA applet 190 incorporates the menu functions 182 specified by the scripts 164 into the first level navigation menu 176. The JAVA applet 190 groups the related functions 184 of the second level navigational menu 178 with the functions 182 of the first level navigational menu 176. The applet 190 displays the related functions 184 as the user selects functions 182.

When the user selects one of the displayed functions 182 in the first level navigation menu 176, e.g., by placing the cursor on the image representing the function 182, the applet 190 generates a list of related functions 184 in the second level navigation menu 178. The related functions 184 are different depending on which function 182 from the first level navigation menu 176 is selected by the user.

When the user selects one of the functions 184 of the second level navigation menu 178, the applet 190 provides a third level navigation menu 180. As shown, the operational section 172 of the interface 154 includes a third level navigation menu 180. The third level navigation menu 180 defines the user selected function 186 that is associated with the HTML insert page.

For example, when the user selects the profile function 182 from the first level navigation menu 176, the applet 190 produces the related functions 184: groups, users, filters, hours, networks, and branch office. When the user selects the related "users" function 184, the management object 152 displays the selected function 186, e.g., "User Management", and generates, in the interactive section 174, an HTML page 198 corresponding to the "add user" function. Thus, through the interface 154 provided by the packet switch 12, the user can select a function and provide the information required by the computer system to add execute the function. For example, the user can define the attributes 162 required to create an additional user.

The management object 152, via the navigational Java applet 190, customizes the menus 176, 178, 180. As the applet 190 reads the menu file 194, the applet 190 removes any of the menu entries 196 that are inconsistent with the attributes 162 of the user. Essentially, the JAVA applet 190 reduces the number of menu entries 196 available to the user based on the attributes 162. Thus, the packet switch 12 dynamically presents different views to different users having different attributes 162, and the packet switch 12 dynamically presents different interfaces 154 to the same user.

However, the system also provides other types of interfaces 154 that are different from the menu produced in the standard interface configuration. For example, the user can navigate the interface 154 using a guided interface configuration, or the user can navigate the interface 154 using a services interface configuration. The guided interface configuration has a more extensive list of menu entries 196 than exist in the standard menu configuration. The menu entries 196 typically include and introduction function for each first level navigational menu 176 and each related function 184 presented in the second level navigational menu 178. The services interface configuration has additional menu entries 196 that are not available to the typical user. The services entries allow access to the switch 12 to allow maintenance functions to provide support representations.

The navigational JAVA applet 190 populates the guided interface and services interface with menu entries 196 in the same manner as the standard menu configuration. However, both the guided interface and the services interface have different corresponding menu files 194 that provide the menu entries 196.

As the user navigates the interface 154, the packet switch 12 uses the set of base management objects 150 to create a set of user-specific management objects 152. The set of user-specific management objects 152 creates additional portions of the interface 154, for example, additional web pages, such as the user table 198*a* shown in FIG. 8. However, as the user navigates the interface 154, the packet switch 12 typically does not indicate to the user that information exists that is not available to the user. Thus, any information discarded, due to inadequate user privileges, from the HTML insert page, or from the management object 152 generally, is transparent to the user.

However, additional security is provides to prevent unauthorized access of the HTML pages 198. Typically, the management object 152 contains scripts 164 from several HTML pages, and the HTML pages contain various tags 166 that provide signals to the management object request processor 156 and, thus, communicate information to the management object request processor 156. In addition, each HTML page 198 contains security tags 166a at the beginning of the HTML page 198. Thus, the management object request processor 156 typically encounters the security tag 166a to determine whether the user has access to the file 160. The management object request processor 156 will examine the security tag 166a before it examines information from the HTML page 198.

If the web page 198 did not contain a security tag 166, the user could call the HTML page 198 directly via the address line 200. Therefore, the data files 160 contain security tags for the files 160 generally, as well as within certain of the scripts 164 or other data. If a user does not have the privileges to access a page that the user has requested, the packet switch 12 produces a standard set of pages that indicate access to the page is denied. Alternatively, the switch 12 could provide a page similar to interface 154, which indicates a null set of available functions. Thus, the switch 12 would not inform the user that functions or information exist which the user cannot access, as is the case when the user selects functions through the menu entries.

For example, when the user requests a web page, e.g., BDY_SYS (a system page) from the web server 202 using a universal resource locator (URL), the web server 202 passes the URL to a section of source code located within the packet switch 12. The packet switch 12 reads the resource location pointed to by the URL, i.e., the data file 160 represented by the URL, from a disk.

If the user has the proper privileges, the management object 152 incorporates the web page as an HTML insert page 198 into the interactive section 174 of the interface 154. If the user does not have the proper privileges, the parser will not return data from the web page, the user receives a standard insert page 198 as the response.

As another example, if the user requests a menu option that allows an administrator to delete a user, the user, by default must be an administrator because only a user having administrative privileges would see the option in the first instance. In addition, an insert page 198 only contains a function button, e.g., a delete button if the user has the privilege to view the option. The function buttons reside within logic of the script 164. The script 164 dictates that the user must have administrative privileges to display the delete button.

As still another example, if the user accesses the system, requests an additional insert page 198a, shown in FIG. 8, containing a table of users, and has privileges to access the table, the packet switch 12 produces an interface 154 displaying the user table. The management object request processor 156 examines the page containing the information needed to produces the table of users. The management object request processor 156 compares a security tag 166a, e.g., noc_sec, with a variable 158 in the management object request processor 156, e.g., "sys user rights", that indicates whether the user has access privileges. If "sys user rights" is not equal to zero (indicating administrative privileges), the packet switch 12 will allow the user to access the user table. The management object request processor 156 parses the user table from the base HTML page and extracts the information associated with each user. The resulting HTML insert page 198a displays the information.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A network packet switch for providing access to a network-based computer system, the network packet switch comprising:

a public access port and a private access port;

a computer-readable medium containing a computer program product for producing management objects used to configure the network packet switch, the computer program product comprising instructions for causing the network packet switch to:

store a set of management objects;

determine attributes of an organization associated with one or more of the management objects;

define a subset of management objects associated with the organization based on the attributes of the organization;

provide the user with the same access to a set of functions defined by the subset of management objects regardless of whether the user accesses the network packet switch by the public access port or the private access port of the network packet switch.

2. The network packet switch of claim 1, wherein at least one management object of the subset of management objects available to the user associated with the organization is unique from other management objects of the subset of management objects available to other users associated with the organization.

3. The network packet switch of claim 1 wherein at least one management object of the subset of management objects available to the user associated with the organization is unique from other management objects of the set of management objects available to other users of other organizations.

4. The network packet switch of claim 1, wherein the subset of management objects define a plurality of graphical user interfaces.

5. The network packet switch of claim 4, wherein the plurality of graphical user interfaces have a first area based on a first programming language and a second area based on a second programming language.

6. The network packet switch of claim 5, wherein the first image is based on the JAVA programming language and the second image is based on the HTML programming language.

7. The network packet switch of claim 5, wherein the first image is based on the JAVA programming language and the HTML programming language.

8. The network packet switch of claim 1, wherein the instructions further cause the switch to:

establish a request processor object to incorporate attributes of the user from a predefined data structure as variables of the request processor object, the data structure defining the attributes of the user, the variables defining the set of management objects associated with the user.

9. The network packet switch of claim 8, wherein the instruction further cause the packet switch to:

parse a data file, based on the attributes incorporated in the request processor object, to produce at least one management object unique to the user.

10. The network packet switch of claim 8, wherein the instructions further cause the packet switch to:

parse a plurality of indicator tags to associate data with the subset of management objects of the user based on the attributes of the user.

11. The network packet switch of claim 10, wherein the plurality of indicator tags comprise a security tag, a server side include tag, and a script tag.

12. The network packet switch of claim 8, wherein the instructions further cause the packet switch to:

parse a plurality of data files to dynamically produce the subset of management objects associated with the user.

13. The network packet switch of claim 1, wherein the instruction further cause the packet switch to:

provide a graphical user interface based on the subset of management objects.

14. The network packet switch of claim 13, wherein the graphical user interface is one interface type of a plurality of interface types.

15. The network packet switch of claim 14, wherein the plurality of interface types includes a standard interface type.

16. The network packet switch of claim 14, wherein the plurality of interface types includes a services interface.

17. The network packet switch of claim 14, wherein the plurality of interface types includes a guided interface types.

18. The network packet switch of claim 1, wherein the instructions further cause the switch to:

associate authorized data of a data file with the subset of management objects of a user; and disassociate unauthorized data of the data file with the subset of management objects of a user.

19. The network packet switch of claim 1, wherein the instructions cause the switch to:

establish a parser based on the attributes of the user and a data manager; and wherein the data manager accepts data parsed by the parser to assemble the subset of management objects.

20. A method for managing a network packet switch for providing access to a network-based computer system, the method comprising:

accessing the network packet switch via either a public access port or a private access port of the network packet switch;

storing a set of management objects;

determining attributes of a user, wherein the user is associated with an organization, and the organization is associated with one or more of the management objects;

providing a customized management object from the set of management objects based on the attributes of the user;

displaying a graphic user interface based on the customized management object, with the customized management object providing the user with access to a set of functions to manage the network packet switch, and with user access to the set of functions and a user's view of the set of functions being the same whether the user accesses the network packet switch via the private access port or the public access port of the network packet switch.

* * * * *